United States Patent
Shaw (10) Patent No.: US 6,727,889 B2
(45) Date of Patent: Apr. 27, 2004

(54) COMPUTER MOUSE INPUT DEVICE WITH MULTI-AXIS PALM CONTROL

(76) Inventor: Stephen W. Shaw, 8 Eiker Rd., Plainsboro, NJ (US) 08512

( * ) Notice: Subject to any disclaimer, the term of this patent is extended or adjusted under 35 U.S.C. 154(b) by 271 days.

(21) Appl. No.: 09/952,266

(22) Filed: Sep. 14, 2001

(65) Prior Publication Data

US 2003/0058219 A1 Mar. 27, 2003

(51) Int. Cl.$^7$ ................................................. G09G 5/00
(52) U.S. Cl. ..................... 345/163; 345/161; 463/37
(58) Field of Search ............................... 345/157, 161, 345/163, 160, 159, 156, 167; 341/21, 156, 159, 164, 165, 166, 167, 184; 463/1, 7, 37, 36, 30; 484/4

(56) References Cited

U.S. PATENT DOCUMENTS

| | | |
|---|---|---|
| 5,162,781 A | 11/1992 | Cambridge |
| 5,260,696 A | 11/1993 | Maynard, Jr. |
| 5,270,692 A * | 12/1993 | Rockwell ................... 345/163 |
| 5,287,090 A | 2/1994 | Grant |
| 5,374,942 A | 12/1994 | Gilligan et al. |
| 5,446,481 A | 8/1995 | Gillick et al. |
| 5,473,344 A | 12/1995 | Bacon et al. |
| 5,633,658 A | 5/1997 | Ma |
| 5,692,956 A | 12/1997 | Rifkin |
| 5,745,055 A | 4/1998 | Redlich et al. |
| 5,754,168 A | 5/1998 | Maynard, Jr. |
| 5,790,102 A | 8/1998 | Nassimj |
| 5,790,769 A | 8/1998 | Buxton et al. |
| 5,841,426 A * | 11/1998 | Dodson et al. ............. 345/163 |
| 5,847,696 A | 12/1998 | Itoh et al. |
| 5,870,081 A | 2/1999 | Wu |
| 5,963,197 A | 10/1999 | Bacon et al. |
| 6,011,543 A | 1/2000 | Tian |
| 6,031,523 A | 2/2000 | Bunke et al. |
| 6,034,670 A | 3/2000 | Chen |
| 6,064,370 A | 5/2000 | Wang et al. |
| 6,064,371 A * | 5/2000 | Bunke et al. ............... 345/163 |
| 6,075,533 A | 6/2000 | Chang |

(List continued on next page.)

FOREIGN PATENT DOCUMENTS

| | | | |
|---|---|---|---|
| GB | WO 92/08208 | * 10/1991 | ........... G06K/11/18 |
| GB | 2283080 | 4/1995 | |
| WO | 9208208 | 5/1992 | |
| WO | 9709709 | 3/1997 | |
| WO | 0025256 | 5/2000 | |

OTHER PUBLICATIONS

International Search Report.
International Application No. PCT/US 02/29244.
Specification for Joystick Control Potentiometer, Model XVL161; Noble U.S.A., Inc./Teikoku Tsushin Kogyo Co., Ltd.
Solid State Optical Mouse Sensor Sample Kit HDNK–2000, Agilent Technologies, Data Sheet and Figures 3.
Agilent ADNS–2001 Optical Mouse Sensor Data Sheet, Agilent Technologies, Revision 0.7, Apr. 18, 2001, pp. 1–10.

Primary Examiner—Vijay Shankar
Assistant Examiner—Mansour M. Said (57) ABSTRACT

A computer mouse-type transducer has a conventional mouse sensor and mouse functionality. In addition, a joystick is mounted on the mouse and activated by a palm controlled treadle conjoined to the mouse via a ball and socket joint. The treadle may be pitched, rolled and, optionally, rotated, with each movement being transduced into a separately interpretable electrical signal. The mouse may include a suspension spring urging the treadle to an unloaded height. Depression of the treadle may be transduced by a switch to change modes of functionality. The mouse may have conventional mouse buttons or may be provided with rocker type buttons that can assume three states.

28 Claims, 4 Drawing Sheets

U.S. PATENT DOCUMENTS

| | | |
|---|---|---|
| 6,091,104 A | 7/2000 | Chen |
| 6,115,028 A | 9/2000 | Balakrishnan et al. |
| 6,130,664 A | 10/2000 | Suzuki |
| 6,164,808 A | 12/2000 | Shibata et al. |
| 6,166,721 A | 12/2000 | Kuroiwa et al. |
| 6,181,322 B1 | 1/2001 | Nanavati |
| 6,184,869 B1 | 2/2001 | Harding et al. |
| 6,188,389 B1 | 2/2001 | Yen |
| 6,188,393 B1 | 2/2001 | Shu |
| 6,191,784 B1 | 2/2001 | Buxton et al. |
| 6,198,473 B1 | 3/2001 | Armstrong |
| 6,204,838 B1 | 3/2001 | Wang et al. |
| 6,323,843 B2 | 11/2001 | Giles et al. |
| 6,323,844 B1 | 11/2001 | Yeh et al. |
| 6,333,734 B1 | 12/2001 | Rein |
| 6,348,912 B1 | 2/2002 | Smith |
| 6,366,274 B1 * | 4/2002 | Elledge .................. 345/163 |
| 6,369,797 B1 | 4/2002 | Maynard, Jr. |
| 6,373,470 B1 | 4/2002 | Andre et al. |
| 6,462,730 B2 | 10/2002 | Numata et al. |
| 6,480,184 B1 * | 11/2002 | Price ..................... 345/163 |
| 6,489,948 B1 * | 12/2002 | Lau ....................... 345/163 |

* cited by examiner

COMPUTER MOUSE INPUT DEVICE WITH MULTI-AXIS PALM CONTROL

FIELD OF THE INVENTION

The present invention relates to computer input peripherals, and more particularly to a mouse-type input device having a plurality of manipulable components and motion-sensing transducers producing a plurality of electrical signals sensible to and interpretable by a computer as a plurality of inputs.

BACKGROUND OF THE INVENTION

Computer programs running interactive software receive and respond to operator input. For example, a word processor receives the input of a keyboard to assemble a text file in memory and display it on a monitor. Depression of a cursor key, such as page-up, page-down, or arrow left or right is received and interpreted by the program to allow control of the text displayed on the monitor and/or the position of the cursor where the text is to be added, deleted, appended to, etc. A mouse may be used as a pointing tool for selecting program options, highlighting text, cursor positioning, scrolling, dragging, etc. In each instance, the input device has a moveable member or members that are manually controlled by the operator and moved in selected positions. The motion induced by the operator is sensed by one or more transducers, e.g., one or more switches, and the transducers generate electrical signals (codes) that the computer receives and programmably interprets to generate a programmable function. For example, the depression of a key may generate a code causing the computer to display a letter on the monitor. The x-y movement of a mouse on a surface, e.g., a mouse pad, is typically transduced into electronic signals via X and Y transducers (rollers engaged with a mouse ball) and sensed and interpreted by a computer program to generate corresponding motion of a pointer graphic on the monitor screen, a "two-dimensional" model for displaying "two-dimensional" virtual objects like a page of text or a map. Computer games may utilize a joystick input device for more complex mechanical emulations, e.g., to simulate an airplane stick for pitch and roll control, typically visually represented by the orientation and/or motion of a displayed graphic with 3-D information.

Various input devices have been proposed to provide more than one type of input for greater control and flexibility of application. For example U.S. Pat. No. 5,446,481 relates to a mouse incorporating a top-mounted, tilting roller or a trackball for providing additional input signals. U.S. Pat. No. 6,166,721 relates to a mouse with a separate top- or side-mounted scroll control button. There is a continuing need however, for improved computer input devices that facilitate the interaction between the operator and the computer in a comfortable and maximally natural or intuitive fashion.

SUMMARY OF THE INVENTION

The problems and disadvantages associated with conventional apparatus and methods of transducing manipulative motions are addressed by the present invention which includes a transducer apparatus operable on a supporting surface for converting the motion of appendages of an operator into electrical signals interpretable by an electronic signal processing device. The apparatus has a base member and a mouse sensor mounted on the base member. The mouse sensor transduces motion of the base member substantially parallel to and relative to the supporting surface into a first electrical signal. A joystick is coupled to the base member and is displaceable to a predetermined extent from a rest position, the displacement of the joystick generating a second electrical signal.

BRIEF DESCRIPTION OF THE FIGURES

For a better understanding of the present invention, reference is made to the following detailed description of an exemplary embodiment considered in conjunction with the accompanying drawings, in which.

DESCRIPTION OF THE PREFERRED EMBODIMENTS

Figure 1:
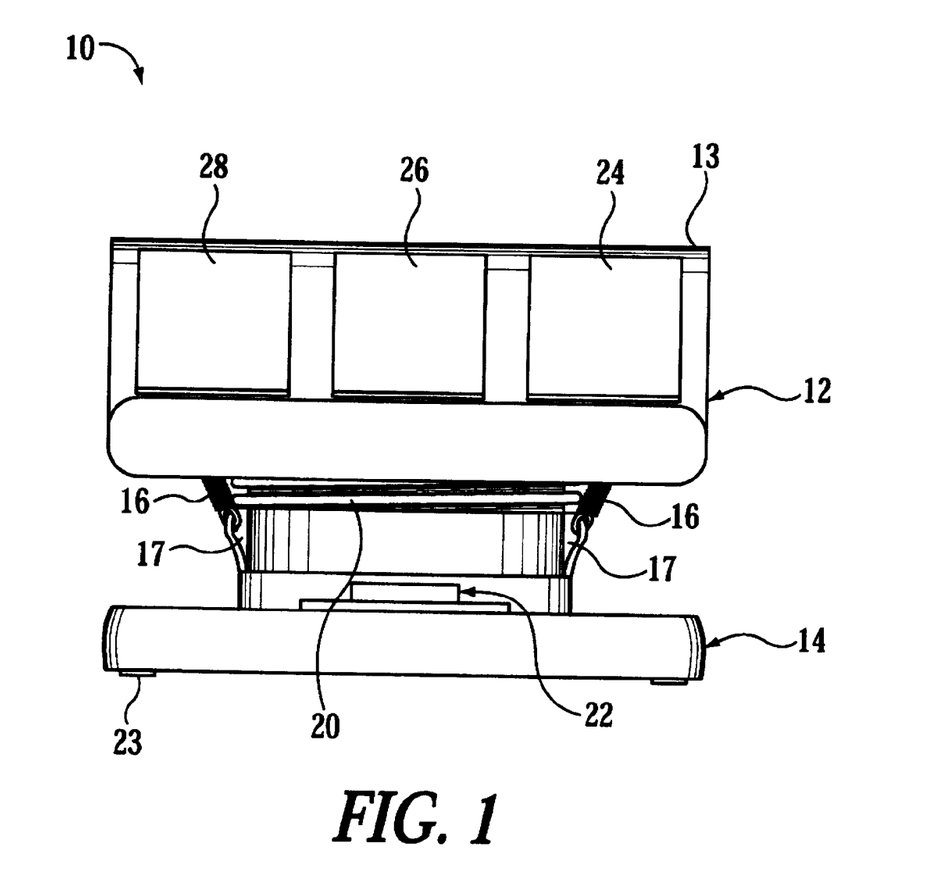
FIG. 1 is a front view of a multi-function mouse in accordance with an exemplary embodiment of the present invention.

FIG. 1 shows a mouse 10 having a hand treadle 12 ergonomically shaped to receive the palm and fingers of the hand of an operator on the upper surface 13 thereof. The treadle 12 is attached to a base 14 via a plurality of assembly springs 16 or other stretchable members, such as lengths of elastomer. The assembly springs 16 are attached to and extend between spring mounts 17 on the base 14 and spring mounts 18 on the underside 19 of the treadle 12 (See FIG. 3).

Figure 2:
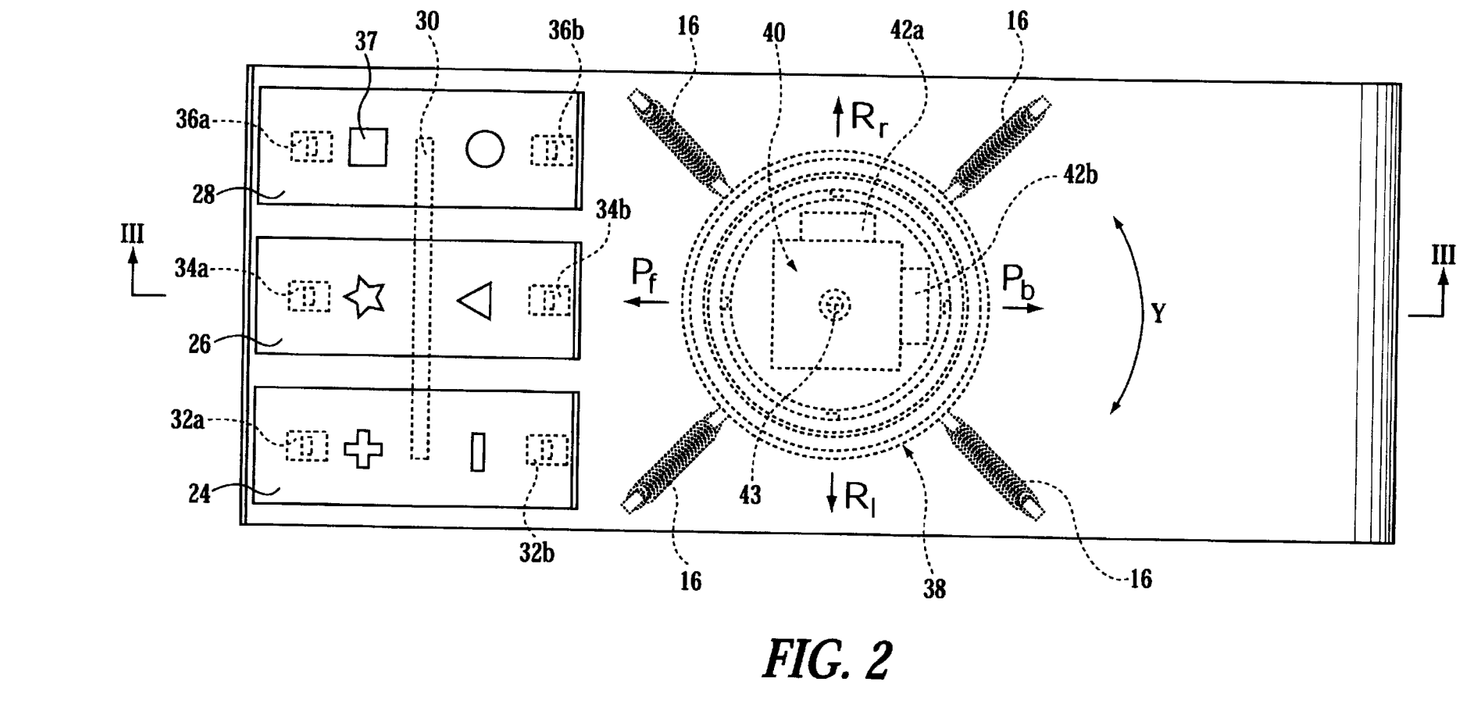
FIG. 2 is a plan view of the mouse shown in FIG. 1.
Figure 3:
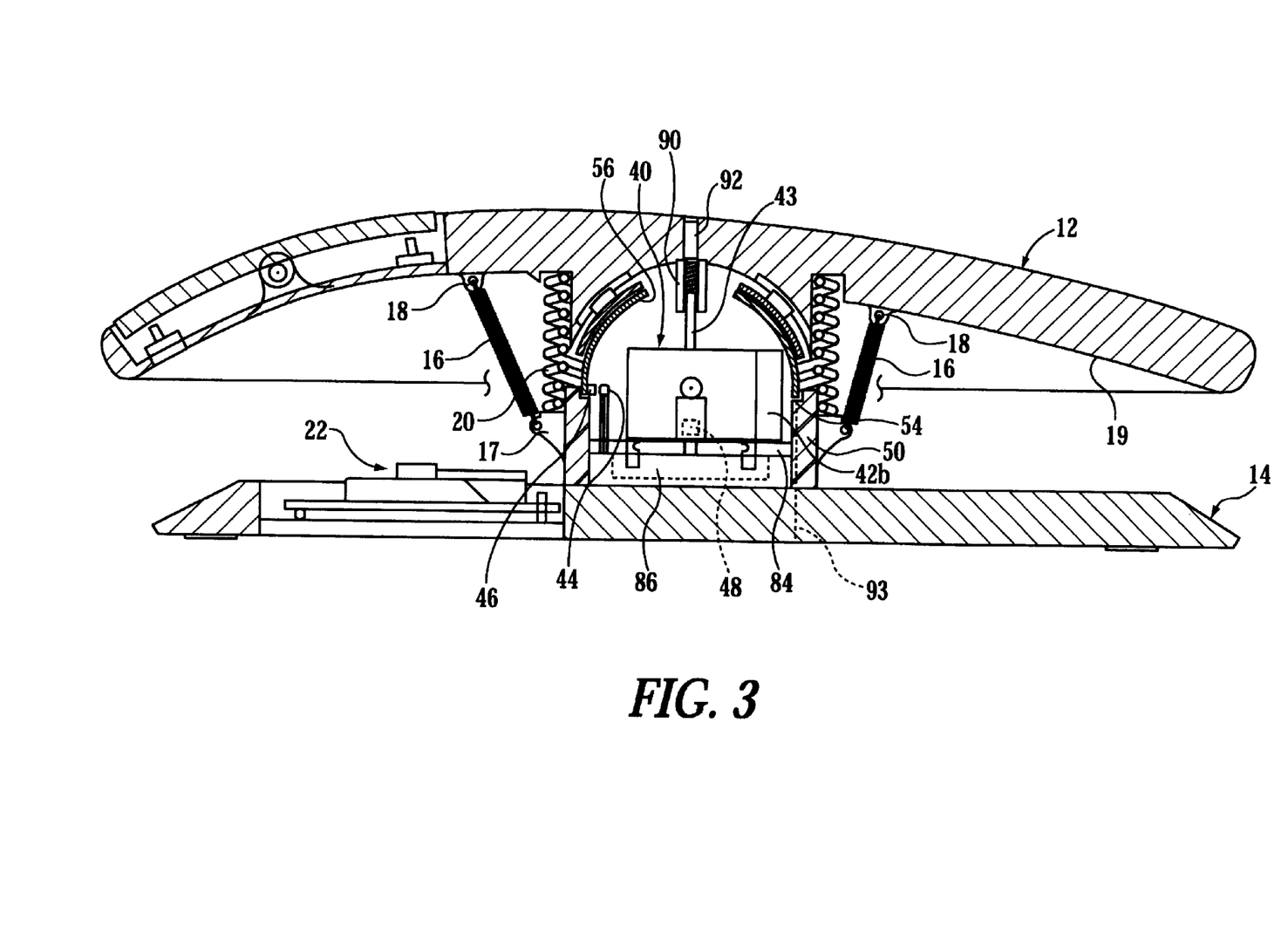
FIG. 3 is a cross-sectional view of the mouse shown in FIGS. 1 and 2 taken along section line III—III and looking in the direction of the arrows.

As can be appreciated from FIG. 2, the mouse 10 preferably has a plurality of counteracting assembly springs 16, each of which exerts a component of force drawing the treadle 12 (shown in FIG. 1 and FIG. 3) toward the base 14 (shown in FIG. 1 and FIG. 3). The springs 16 counteract one another to induce the treadle to assume a rest position but which permit the treadle 12 to be displaced from the rest position, i.e., pitched, rolled or rotated. A suspension spring 20 (shown in FIG. 1 and FIG. 3) approximating a cylindrical shape (e.g., a spiral metal or plastic spring or a cylindrical, elastomeric member) may be incorporated to urge the treadle 12 away from the base 14. Suspension spring 20 counteracts the assembly springs 16 to force the treadle 12 into a rest position displaced a first distance from the base 14. When an operator exerts downward force on the treadle 12, pushing it toward the base 14, the spring 20 is compressed to allow the treadle 12 to assume a second position closer to the base 14. The first and second positions of the treadle 12 relative to the base 14 can be utilized in conjunction with a push-type switch to provide a signal indicative of selecting one of two states. For example, a first state may be indicative of the operator choosing to utilize the mouse as a conventional mouse, whereas the second state may be indicative of the user opting to enable additional functions over and above traditional mouse functions, as shall be described further below.

It should be appreciated that a suspension spring (like suspension spring 20) that is attached to the base 14 at one end and attached to the treadle 12 at the other (e.g., by overmolding the spring end) by clamping or screw attachment, could perform assembly and positioning functions for the treadle 12 allowing it to be pitched, rolled and rotated, as well as permitting the treadle 12 to assume two levels of vertical displacement relative to the base 14. In this alternate embodiment, a suitably selected and attached central suspension spring could be utilized to eliminate the assembly springs 16.

FIG. 1 shows that the mouse 10 has an optical mouse sensor 22 disposed on the base 14. The mouse sensor 22 is conventional and may be obtained commercially. For example, a suitable optical mouse sensor is made by Agilent Technologies, Part Nos. ADNS-2001 or HDNS 2000 and is available in kits No. ADNB-2012 or HDNK-2000 with a lens, LED, etc. While an optical mouse sensor is shown in the drawings, any other type of conventional mouse sensor could be employed, e.g., the conventional mouse ball with x and y coordinate roller sensors. Conventional skid pads or bars 23 are provided to insure the proper spacing of the sensor from the surface upon which the mouse 10 is operated. A plurality of depressable keys/buttons 24, 26, 28 are arrayed on the treadle 12 to provide conventional mouse button input, as well as augmented input. The number of buttons 24, 26, 28 may be selected to be greater or lesser than three, as demanded by the application and requirements of the user. As shall be described below, the present invention includes a feature whereby each of the buttons may have three positions, i.e., ON1, ON2 and OFF. Accordingly, the mouse 10 of the present invention has conventional mouse functioning that would be appropriate for cursor control, right and left click, drag and drop, etc., as well as additional unique features further described below.

FIG. 2 shows that the buttons 24, 26, 28 pivot centrally on a common axle 30 (shown in dotted lines) to alternately actuate opposing switches (32a, 32b), (34a, 34b) and (36a, 36b), respectively, to provide six independent switch activation signals. A combination of more than one switch (e.g., the combination of 32b and 34a or the combination of 32a, 34b, and 36a) may be activated simultaneously (chording). The buttons (e.g., the button 24) may be provided with a central OFF position to which the button 24 is resiliently biased, e.g., by a spring or springs. Alternatively, a pair of switches, e.g., 32a 32b may bear against the underside of the associated button (e.g., the button 24) with the internal switch resistance against depression holding the button 24 in a neutral position.

Since the finger actuated buttons 24, 26, 28 of the present invention are pivoted in the center of the button (not at the ends like regular mouse buttons) the basic number of button signals is doubled. The rocking click motion of the buttons 24, 26, 28 is also unique in that by merely sliding the fingers applied to the buttons forward and backward, both positions of each button 24, 26, 28 are attainable without having to reposition the palm or interfere with any other of the mouse control functions. If three buttons 24, 26, 28 are used, then six single click functions and twenty-four chorded functions are available. If the first key pressed is considered the root function and any following keys considered modifiers dependent on the order they are pressed, then dozens of combinations are possible. For new users, the front click and back click functions can be made redundant to simplify mouse operation. The fore and aft surfaces of each button 24, 26, 28 may have a different texture or indicia 37 to tactually alert the user as to the position of the operator's finger on the button. In this regard, the indicia can be tailored for the application (e.g., to meet the standards established for items purchased by the agencies of the United States in compliance with the Americans with Disabilities Act).

The treadle 12 is movably mounted on the base 14 via a compound ball and socket joint 38 that permits the treadle 12 to pitch forward and back relative to the base 14, as shown by arrows Pf, Pb, to roll right and left, as shown by arrows Rr and Rl and to yaw or rotate on a central axis as shown by arc Y. The pitch and roll motions are transduced into electrical signals by a standard joystick control potentiometer 40 (e.g., as is commercially available from Noble, U.S.A., Inc. of Rolling Meadows, Ill. under the model number designation XVL161). Joystick potentiometers typically have two potentiometers 42a, 42b arranged at 90 degrees relative to each other, one to sense pitching movement and the other to sense rolling movement and any simultaneous combination thereof. More particularly, the joystick potentiometer 40 can sense pitching in the North/South direction, rolling in the East/West direction and combination pitching and rolling, e.g., in the Northeast/Southwest direction.

A joystick potentiometer 40 does not typically sense on yawing or rotation, nor allow the input shaft 43 to be rotated. As more particularly shown and described below with reference to FIG. 3, this transducing function is provided by a rheostat or Hall effect device with a central, stationary sensor 44 and a moveable sensed element 46 mounted to a rotatable support 56 in the ball and socket joint 38. Alternatively, a linear magnetic strip may be mounted to the rotatable support in the place of the resistance element 46 and the wiper replaced with a Hall effect device. Certain joystick potentiometers 40, such as the Noble XVL161, have an internal momentary switch 48 that is activated by pressing the input shaft 43 down in an axial direction (as defined by the axis of the input shaft). In the present invention, this momentary switch 48 can optionally be utilized to toggle between a conventional mouse mode and an enhanced mode, which enables those additional input functions provided by the present invention (i.e., associated with the pitching, rolling and yawing motions of the treadle 12). In this manner, a user who has a more strenuous grip on the mouse 10 and who does not want to inadvertently generate the signals produced by the pitching, rolling or yawing motions of the treadle 12, may toggle those signals on/off, or alternatively, send an enable/disable signal to the mouse controller circuitry/software via operation of the momentary switch 48.

Figure 4:
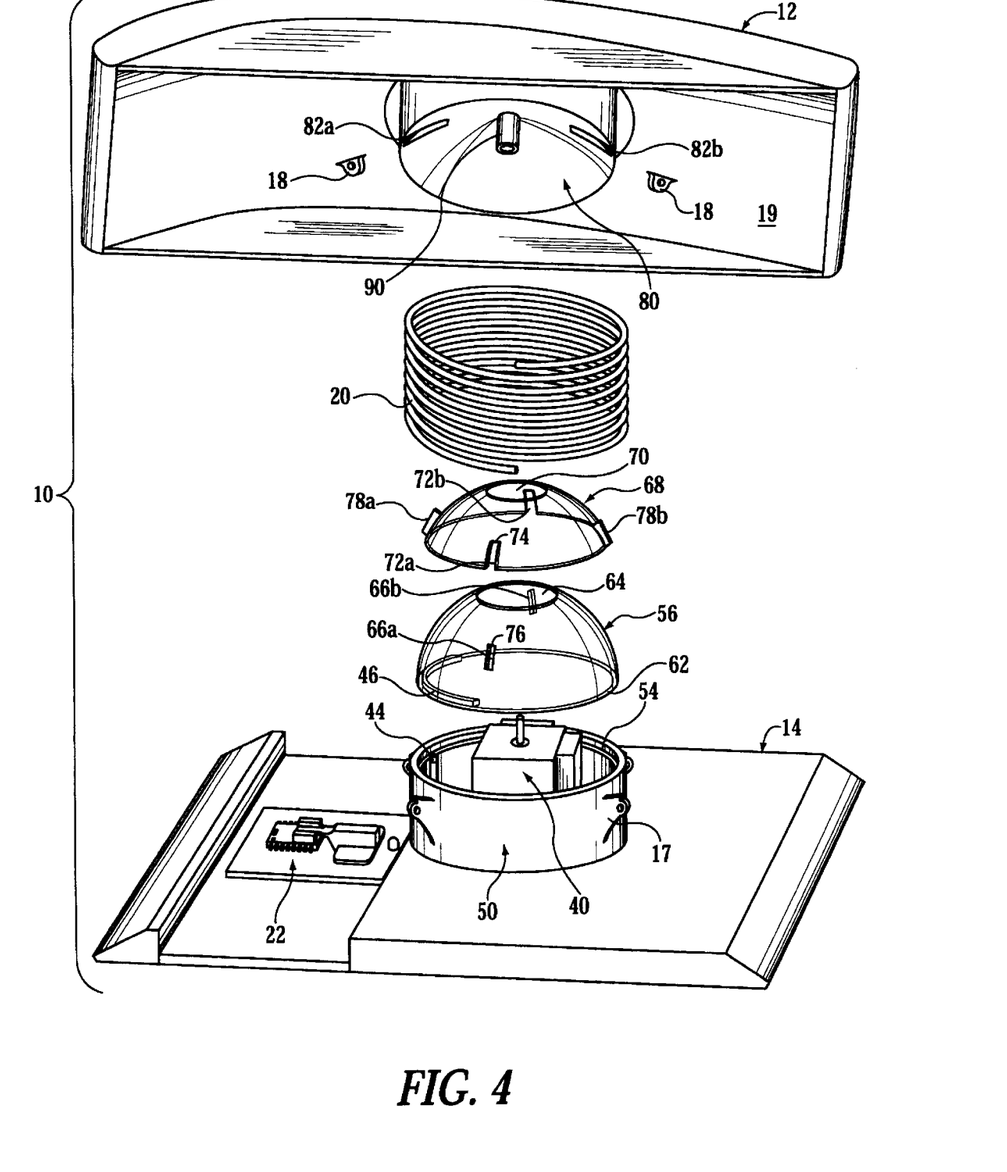
FIG. 4 is an exploded perspective view of the mouse of FIGS. 1–3.

FIGS. 3 and 4 show the various components allowing the treadle 12 to be pitched, rolled and yawed relative to the base 14. More particularly, the base 14 has a stationary support 50 which accommodates the joystick potentiometer 40 and the stationary sensor 44 therein with the input shaft 43 of the joystick potentiometer 40 extending upwardly. The support 50 has a generally annular recessed ledge 54 along the upper inner peripheral edge thereof for rotatably supporting a rotatable spheric section 56. The rotatable spheric section 56 may be generally hemispherical or may have a generally hemispherical upper portion disposed atop a cylindrical lower portion. In either case, a lower edge 62 of the rotatable spheric section 56 inserts into the upper end of the stationary support 50 resting upon the recessed ledge 54, permitting the rotatable section 56 to be rotated on the support 50. Alternatively, the ledge 54 could be provided on the outer peripheral edge of the support 50 with the lower edge 62 of the rotatable section 56 abutting it, or an internal shoulder may be formed on the interior of the rotatable section 56 for sliding upon a mating, upwardly extending annular surface of the support 50. The stationary sensor 44 may be in the form of the wiper of a rheostat or a Hall effect device pickup. The moveable sensed element 46 would be a resistor wire in the case of a rheostat, or alternatively, a linear magnetic strip is attached to the lower inner peripheral edge of the rotatable spheric section 56 such that it aligns with the stationary sensor 44 when the rotatable section 56 is positioned on the support member 50. The upper portion of the first rotatable member is generally hemispheric with a central aperture 64 and at least one and preferably a pair of positioning vanes 66a, 66b for controlling the relative position of a second or intermediate spheric section 68. The intermediate spheric section 68 has a central aperture 70 and at least one slot(s) 72a, 72b for accommodating the positioning vanes 66a, 66b extending from the outer surface of the rotatable section 56, such that the intermediate section 68 can be articulated relative to the rotatable section 56 in ball and socket fashion, but constrained in direction and extent (displacement magnitude) as defined by the positioning vanes 66a, 66b and mating slot(s) 72a, 72b. More particularly, looking at FIG. 4, the intermediate section 68 can be shifted toward the viewer until the inner terminal wall 74 of the slot 72a facing the viewer encounters the inner edge 76 of the positioning vane 66a closest to the viewer. The intermediate spheric section 68 has at least one and preferably a pair of positioning vanes 78a, 78b disposed at a 90 degree offset from the slots 72a, 72b. A socket 80 extends from the underside of the treadle 12 and has a surface curvature approximating that of the upper surface of the intermediate spheric section 68. The positioning vanes 78a, 78b of the intermediate spheric section 68 are received in corresponding slots 82a, 82b formed in the socket 80 of the treadle 12. The socket 80 matingly and slidably receives the intermediate spheric section 68. As before, the positioning vanes 78a, 78b of the intermediate spheric section 68 constrain the motion of the socket 80 and treadle 12 relative thereto in extent and direction. The positioning vanes 66a, 66b of the rotatable section 56 are preferably disposed either in alignment with (parallel to) the longitudinal or lateral axis of the base 14 when in the rest position. The slots 82a, 82b in the socket 80 are therefore parallel to the longitudinal (as shown in FIG. 4) or lateral axis of the base 14 and treadle 12. It should be appreciated that the slots 82a, 82b could be replaced with positioning vanes which would be received in mating slots formed in the intermediate section 68. Similarly, the positioning vanes 78a, 78b could be inwardly directed and be accommodated in mating slots formed in the rotatable spheric section 56. As yet a further alternative, the "ball element" 50, 56, 68 may be coupled to the treadle 12 and the socket 80 associated with the base 14. In this construction, the joystick potentiometer 40 would then reside in the treadle 12.

The springs 16 extend radially outward and upwardly from four spring mounts 17 on the base 14 and attach at their opposite ends to corresponding spaced spring mounts 18 on the underside 19 of the treadle 12 (see FIGS. 2 and 3). The springs 16 are preferably of approximately equal length and strength, such that the treadle 12 is pulled down against the compound ball and socket assembly 38 in alignment with the longitudinal axis of the base 14. As shown in FIG. 4, the orientation of the socket slots 82a, 82b provide for the pitching motion of the treadle 12 relative to the base 14, with the slots 72a, 72b allowing rolling motion. If the foregoing slots were aligned at 90° degrees relative to their respective positions shown, slots 82a, 82b would provide rolling motion and slots 72a, 72b pitching motion. Because the rotatable section 56 is free to rotate on support 50, and the elements of the compound ball and socket joint 38 are keyed together by vanes 66a, 66b, 78a, 78b and mating slots 72a, 72b and 82a, 82b, a rotary torque applied to the treadle 12 will transfer through the intermediate spheric section 68 to the rotatable spheric section 56, the motion of which is sensed by sensor 44. Accordingly, the present invention provides the user with joystick functions actuated by the palm of the hand, a yaw motion transducer, conventional mouse functions and new enhanced mouse button functions in one unit with six distinct available natural motions, viz., pitch forward and back, roll right and left and yaw clockwise and counterclockwise. Yaw, pitch and roll movements are controlled by the user's palm and are easily combined and coordinated with conventional mouse motions and button activation while the user's arm and hand positions remain in relaxed positions similar to those assumed when using a regular mouse.

FIG. 3 shows that the support 50 may have a platform 84 which spans the support 50 and receives the joystick potentiometer 40 thereon. A printed circuit board 86 and/or wire connectors may be positioned beneath the platform 84 to receive the terminals of the joystick potentiometer 40. Since the input shaft 43 is typically formed with flats and is not intended to be rotated, the treadle socket 80 has a bushing 90 extending from the underside thereof that slidably receives the input shaft 43 therein, permitting the treadle 12 to be rotated relative to the input shaft 43. To compensate for variations in the dimensions of the various elements of the mouse 10 (e.g., the rest height of the suspension spring 20 as it acts against the assembly springs 16), an adjustment screw 92 is threaded through the treadle 12 and/or bushing 90 advancing toward or away from the input shaft 43 and providing the proper contact for operation of the momentary switch 48 optionally present in the joystick potentiometer 40. The momentary switch 48 would typically have a very short travel, such that its operation requires a minimal amount of play in the compound ball and socket assembly 38 (shown in FIG. 2). Use of a momentary switch 48 also requires that the suspension spring 20 is of the correct height to provide the play needed for operation of the momentary switch 48. Either the relaxed height of the suspension spring 20 and the relaxed length of the assembly springs 16 can be chosen such that the required clearance is provided and the springs are all just beginning to be compressed/stretched, or the relative lengths and strengths of the springs 20, 16 can be chosen to provide an equilibrium with the proper clearance.

It should be appreciated that the compound ball and socket joint 38 of the present invention permits the treadle 12 to undergo pitch, roll and yaw displacements and to transduce all three displacements. In the event that only a subset of these motions, e.g., pitch and roll were desired, a simple ball and socket arrangement could be employed. For example, pitch and roll movements to activate a joystick potentiometer 40 could be supplied by the rotatable section 56 being fixedly attached to the support 50 (e.g., by gluing or integral formation with the base 14 and a plain, mating treadle socket 80 placed thereover and held in association with the base 14 by the assembly springs 16). The bushing 90 would preferably be retained to insulate the input shaft 43 from inadvertent axial twisting in the course of operation. Alternatively, the input shaft 43 could be protected from torsion by employing an integral first spheric section 56 fixed to the base 14 and having positioning vane(s) 66a, 66b (shown in FIG. 4), an intermediate spheric section 68 (shown in FIG. 4) and the slotted socket 80 (shown in FIG. 4). For some applications, it may be advantageous to provide a clamp or stop to mechanically disable one of the moveable elements of the mouse 10. For example, a moveable stop pin 93 may extend through the base 14 and support 50 to insert into a stop recess provided in the rotatable spheric section 56 for selectively immobilizing it. The position of the stop pin 93 would be controlled by a conventional mechanism such as screw threads or a camming mechanism/switch.

Similarly, the momentary switch 48 is optional, and if eliminated, the suspension spring 20, the adjustment screw 92 and clearance in the compound ball and socket joint 38 could be eliminated as well. It should be appreciated that selection of relatively stiff assembly springs 16 that provide substantial resistance to pitch or roll would provide the benefit of guarding against inadvertent activation of the pitch and roll functions while employing the mouse 10 as a conventional mouse. Namely, if the pitching and rolling motions require substantial force, then it is unlikely that they will be activated unintentionally. Accordingly a simplified version of the present invention which has both mouse and palm controlled joystick functionality would simply employ a plain ball and socket joint and assembly springs 16 or a cylindrical resilient member 20 to hold and center the treadle 12 on the base 14 and permit it to pitch and roll to move the input shaft of the joystick potentiometer 40.

The present invention 10 visually resembles an ordinary mouse input device while providing the functionality of a mouse and a joystick in one unit. Due to the enhanced keying capacity, the added yaw movement, the palm control and the synergy of the combination of features, the functionality of the present invention surpasses both a mouse and a joystick individually within each of their own native environments. As a result, the present invention can provide enhanced speed and functionality for both business applications and games through a device that is visually and tactually familiar and operates intuitively. A customizable software device manager would permit the user to activate as many of the features as desired on a per program basis. The enhanced functionality of the present invention 10 comes from its ability to provide simultaneous multi-axis control, or alternatively, the independent axial control of each emulated device, while maintaining a normal and comfortable mouse-type grip. Each of these controls may be configured independently through a software device manager. Unlike the prior art, the present invention's multi-axis control is implemented by the user's palm, rather than the user's In the business arena, one of its greatest benefits of the present invention 10 is the ability to perform a vertical and/or horizontal screen scroll without the use of a conventional scroll bar. More particularly, conventional scrolling requires the user to accurately find the scroll bar and either click on it or drag it, all while looking at the document and not the scroll bar. Frequently, the user will drift the mouse pointer in the wrong direction and lose control of the bar, requiring the user to look away from the document to find and reacquire the scroll bar. The present invention 10 allows the user to leave the pointer anywhere over the document and merely rock or roll the treadle 12 to effect vertical and/or horizontal scrolling movement. By using the palm to accomplish this control function, the fingers are left in their normal control position to activate the trigger buttons 24, 26, 28. In addition, the conventional mouse function of pointer control is continuously available. This is an exceptional time saver and dramatically reduces mental and physical fatigue on the user when working with large documents or images that require constant movement throughout the document or image. The yaw movement of the present invention can be programmably interpreted to allow cycling through a series of spreadsheets/worksheets within a workbook.

When playing games, the present invention provides a simple, lower cost and lower physical effort alternative to a joystick/pedal control. For example, the present invention could be used to provide a single point of control for flight simulator games by allowing banking, climbing, diving, rudder and throttle control, all without the user taking his eyes off the screen to hunt for keys on the keyboard or having to move his fingers to some abnormal position on the mouse. The present invention 10 therefore provides a familiar platform with significantly improved functionality while requiring minimal training because it is intuitive to the user.

Movement Definitions

The following chart shows a list of exemplary interpretations of the various mouse movements and button depressions available with the present invention for two common applications.

The first example illustrates the use of the present invention in conjunction with the operation of a computerized spreadsheet. In the second example, the present invention is applied to a computer game.

I—Spreadsheet Example

| ACTION | CONSEQUENCE |
|---|---|
| Rotationally Enhanced Joystick Functions (Treadle Movements) | |
| Pitch/Rock Forward and Back | Scroll Up and Down |
| Roll Right and Left | Scroll Left and Right |
| Yaw/Rotate Clockwise | Step through sheets of a workbook forward |
| Yaw/Rotate Counterclockwise | Step through sheets of a workbook backward |
| Conventional Mouse Functions (Optical Mouse Sensor/Mouse Ball Movements) | |
| Push | Move Pointer Up |
| Pull | Move Pointer Down |
| Side Slide | Move Pointer Left and Right |
| Button Functions (Using Three (3) Rocker Type Buttons Of The Present Invention) | |
| Forward Click Left Button | Select Object |
| Forward Click Middle Button | Double Click |
| Forward Click Right Button | Properties Menu |
| Back Click Left Button | Undo or Browser Back |
| Back Click Middle Button | User Defined or Appln. Specific |
| Back Click Right Button | User Defined or Appln. Specific |

II—Flight Simulator Example

| ACTION | CONSEQUENCE |
|---|---|
| Treadle Movements | |
| Pitch/Rock Forward and Back | Ailerons - Roll Left and Right |
| Right and Left | Ailerons - Stick Up and Down |
| Yaw/Rotate Clockwise | Rudder Right |
| Yaw/Rotate Counterclockwise | Rudder Left |
| Basic Mouse Movements | |
| Push | Increase Throttle |
| Pull | Decrease Throttle |
| Side Slide | TBD of User Defined |
| Button Functions | |
| Left Button | Autopilot or User Defined |
| Right Button | Brakes or User Defined |
| Middle Button | Trim Flaps or User Defined |

When doing pitch and roll scrolling with the present invention, the degree of pitch or roll is preferably interpreted as a rate for scrolling. For example, the number of lines scrolled per second may correspond to one tenth the percentage of the total angular range of motion of the pitch or roll travel from the rest position. Another variant would be to use the previous method up to the fifty percent mark and then double the rate for each ten percent that follows, up to 120 lines at 100 percent.

It should be understood that the embodiment described herein is merely exemplary and that a person skilled in the art may make many variations and modifications without departing from the spirit and scope of the invention as defined in the appended claims. For example, while the present invention has been described herein as a device interacting with a user's arm, hand and fingers, the present invention may be readily adapted to be operated by leg, foot and toe movements to accommodate a person whose arm, hand and/or fingers are disabled or missing. While the present invention has been described above as utilizing a conventional joystick potentiometer to sense on joystick motion, other position sensing technologies such as optical or magnetic position sensing may be utilized. Accordingly, all such variations and modifications are intended to be included within the scope of the invention as defined in the appended claims.

I claim:

1. A transducer apparatus operable on a supporting surface for converting the motion of an appendage of an operator into electrical signals interpretable by an electronic signal processing device, comprising:
   (a) a base member adapted for translational motion in all planar directions parallel to and relative to said supporting surface in response to translational motion of the appendage;
   (b) a translational sensing assembly capable of detecting said translational motion and producing electrical signals therefrom;
   (c) a member responsive to pitch motion from the appendage;
   (d) a pitch motion sensing assembly capable of detecting said pitch motion and producing electrical signals therefrom;
   (e) a member responsive to roll motion from the appendage;
   (f) a roll motion sensing assembly capable of detecting said roll motion and producing electrical signals therefrom;
   (g) a member responsive to yaw motion from the appendage;
   (h) a yaw motion sensing assembly capable of detecting said yaw motion and producing electrical signals therefrom;
   (i) a means for alternatively selecting electrical signals produced by the translational sensing assembly from electrical signals produced by the roll, pitch, and yaw sensing assemblies; and,
   (j) a top cover coupled to said base member, and free to move in pitch, roll, and yaw motion relative to said base member in response to the movements of said appendage.

2. The transducer apparatus of claim 1 further comprising:
   (a) a member responsive to vertical force applied by the appendage;
   (b) a compression sensing assembly capable of detecting said vertical force and producing electrical signals therefrom.

3. The transducer apparatus of claim 1 wherein said means to alternatively select is a momentary switch mechanically coupled to said top cover.

4. The transducer apparatus of claim 1 further comprising at least one electro-mechanical switch thereon for producing electrical signals responsive to movement of a sub-unit of said appendage.

5. The transducer apparatus of claim 4 wherein said means to alternatively select comprises said electro-mechanical switch.

6. The transducer apparatus of claim 4 wherein said electro-mechanical switches are momentary switches.

7. The transducer apparatus of claim 4 wherein at least two of said electro-mechanical switches are interlocked to prevent simultaneous operation thereof.

8. The transducer apparatus of claim 4 wherein roll, pitch, and yaw movement of the top cover, as well as translational motion of said apparatus by said appendage, and as well as movement of said electro-mechanical switches by said sub-units of said appendage controls user defined functions in a computer.

9. The transducer apparatus of claim 1 wherein said top cover further comprises a means for converting the roll and pitch movements of said top cover to movements of a joystick handle.

10. The transducer apparatus of claim 9 wherein said member responsive to pitch motion, said member responsive to roll motion, and said member responsive to yaw motion comprise three concentric partial spherical members, namely an outer member, a middle member, and an inner member, and wherein said joystick handle is positioned to pivot at or near the center of the concentric partial spherical members.

11. The transducer apparatus of claim 10 wherein the concave sides of said partial spherical members are oriented to face the base.

12. The transducer apparatus of claim 10 wherein the outer member is attached to and moves with said top cover.

13. The transducer apparatus of claim 12 further comprising a cavity at the center of the outer member wherein said cavity partially envelopes the joystick handle.

14. The transducer apparatus of claim 13 wherein said cavity is in a bushing protruding from the center of the outer spherical member.

15. The transducer apparatus of claim 13 further comprising clearance holes in both the middle and inner members to accommodate motion of the joystick handle.

16. The transducer apparatus of claim 15 wherein a first interface between the outer member and the middle member comprises mating guides to constrain the relative motion at said first interface to a first plane, and wherein a second interface between the middle member and the inner member comprises mating guides to constrain the relative motion at said second interface to a second plane, said first plane being substantially perpendicular to said second plan.

17. The transducer apparatus of claim 16 further comprising a circular track rotatably engaging the perimeter of inner member.

18. The transducer apparatus of claim 17 wherein said yaw motion sensing assembly is positioned to sense the relative motion between the circular track and the inner member.

19. The transducer apparatus of claim 9 further comprising a sensor for longitudinal motion of the joystick handle and a linkage to transmit such motion from the top cover.

20. The transducer apparatus of claim 19 wherein said linkage comprises an adjusting screw.

21. The transducer apparatus of claim 1 further comprising at least one spring to draw the base member and top cover toward each other.

22. The transducer apparatus of claim 21 further comprising at least one spring to urge the base member and top cover away from each other.

23. The transducer apparatus of claim 1 wherein the electronic signal processing device is a computer.

24. The transducer apparatus of claim wherein roll, pitch, and yaw movement of the top cover as well as translational motion of said apparatus by said appendage controls movement of a cursor on a computer screen.

25. The transducer apparatus of claim 1 wherein roll, pitch, and yaw movement of the top cover as well as translational motion of said apparatus by said appendage controls scrolling on a computer screen.

26. A transducer apparatus operable on a supporting surface for converting the motion of an appendage of an operator into electrical signals interpretable by an electronic signal processing device, comprising:

(a) a means for providing translational motion in all planar directions parallel to and relative to said supporting surface in response to translational motion of the appendage;

(b) a means for detecting said translational motion and producing electrical signals therefrom;

(c) a means responsive to pitch motion from the appendage;

(d) a means for detecting said pitch motion and producing electrical signals therefrom;

(e) a means responsive to roll motion from the appendage;

(f) a means for detecting said roll motion and producing electrical signals therefrom;

(g) a means responsive to yaw motion from the appendage;

(h) a means for detecting said yaw motion and producing electrical signals therefrom;

(i) a means for alternatively selecting electrical signals produced by the translational sensing assembly from electrical signals produced by the roll, pitch, and yaw sensing assemblies; and, (j) a means for converting the movements of said appendage, free to move in pitch, roll, and yaw motion relative to said supporting surface.

27. The transducer apparatus of claim 26 further comprising:

(a) a means responsive to vertical force applied by the appendage;

(b) a means for detecting said vertical force and producing electrical signals therefrom.

28. The transducer apparatus of claim 26 further comprising at least one means thereon for producing electrical signals responsive to movement of a sub-unit of said appendage.

* * * * *